US009608735B2

(12) United States Patent
Gorshtein et al.

(10) Patent No.: US 9,608,735 B2
(45) Date of Patent: Mar. 28, 2017

(54) MIMO EQUALIZATION OPTIMIZED FOR BAUD RATE CLOCK RECOVERY IN COHERENT DP-QPSK METRO SYSTEMS

(71) Applicant: MULTIPHY LTD., Ness Ziona (IL)

(72) Inventors: Albert Gorshtein, Ashdod (IL); Guy Dorman, Mishmar David (IL); Dan Sadot, Kfar Bilu (IL)

(73) Assignee: Multiphy Ltd., Ness Ziona (IL)

( * ) Notice: Subject to any disclaimer, the term of this patent is extended or adjusted under 35 U.S.C. 154(b) by 51 days.

(21) Appl. No.: 14/643,746

(22) Filed: Mar. 10, 2015

(65) Prior Publication Data
US 2015/0263813 A1 Sep. 17, 2015

Related U.S. Application Data

(60) Provisional application No. 61/951,016, filed on Mar. 11, 2014.

(51) Int. Cl.
| | |
|---|---|
| *H04B 10/00* | (2013.01) |
| *H04B 10/61* | (2013.01) |
| *H04B 10/2575* | (2013.01) |
| *H04J 14/06* | (2006.01) |
| *H04B 10/40* | (2013.01) |
| *H04L 27/18* | (2006.01) |
| *H04L 25/03* | (2006.01) |
| *H04B 7/0413* | (2017.01) |
| *H04L 7/00* | (2006.01) |
| *H04L 27/20* | (2006.01) |

(52) U.S. Cl.
CPC ....... *H04B 10/6166* (2013.01); *H04B 7/0413* (2013.01); *H04B 10/2575* (2013.01); *H04B 10/40* (2013.01); *H04J 14/06* (2013.01); *H04L 7/0062* (2013.01); *H04L 25/03* (2013.01); *H04L 27/18* (2013.01); *H04L 27/2096* (2013.01)

(58) Field of Classification Search
CPC . H04B 10/2575; H04B 10/40; H04B 10/6166
See application file for complete search history.

(56) References Cited

U.S. PATENT DOCUMENTS

| | | | | |
|---|---|---|---|---|
| 2010/0142607 | A1* | 6/2010 | Kim | H04L 5/04 375/232 |
| 2012/0308234 | A1* | 12/2012 | Bianciotto | H04B 10/614 398/65 |
| 2013/0259112 | A1* | 10/2013 | Bae | H04L 25/03891 375/232 |
| 2014/0369685 | A1* | 12/2014 | Calabro | H04B 10/614 398/65 |

* cited by examiner

*Primary Examiner* — Dzung Tran
(74) *Attorney, Agent, or Firm* — Fenwick & West LLP (57) ABSTRACT

The present invention is directed to a MIMO equalization system and method, optimized for baud rate clock recovery in coherent symbol-spaced DP-QPSK Metro systems. According to this method, the Mueller & Muller timing function is extended to cope with controlled ISI induced signals, while decoupling between MIMO equalization and clock recovery loops, using a midpoint output of the equalizer for timing estimation, instead of its final output. At least a portion of controlled Inter-Symbol Interference (ISI) is kept intact and the controlled ISI is compensated by an MLSE, right after carrier timing synchronization.

6 Claims, 5 Drawing Sheets

MIMO EQUALIZATION OPTIMIZED FOR BAUD RATE CLOCK RECOVERY IN COHERENT DP-QPSK METRO SYSTEMS

FIELD OF THE INVENTION

The present invention relates to the field of optical communication systems. More particularly, the invention relates to a method and system for providing Multiple-Input Multiple-Output (MIMO) equalization for baud rate clock recovery in coherent DP-QPSK metro and data-center interconnection applications.

BACKGROUND OF THE INVENTION

The market of Metropolitan Optical Networks (or metro networks which are optical networks spanning distances up to several hundred kilometers, typically serving large, concentrated metropolitan areas, interconnecting a full-range of client protocols from enterprise/private customers in access networks to backbone service provider networks) is becoming the largest transport segment of high-speed interconnection in current and future Optical Networks. During the last years, the network's topologies and structures have been experiencing a paradigm shift in such a way that the ultra-high speeds links occurs mostly within Metro distances.

Unlike earlier topologies (where the high speed links were mainly in ultra-long haul networks between the network hubs) in the Metropolitan Optical Networks, the links' speed were reduced, as in a classical tree hierarchy. The main drivers of the recent changes come from the content delivery evolution and data centers topologies, which effectively generate the lion's share of high speed interconnection within metro distances. This includes, for example, interconnection between the cities and the data center "warehouses" that are usually located external to the city centers, in the range of up to 40 miles.

As a result, there is a need for Metro-focused solutions in the speed of 100 G and above. The major parameters that define this Metro segment are price, power and performance. However, the priorities between these three parameters, and the actual parameters values, are significant and unique to the Metro segment. In addition to spectral efficiency, high Optical Signal To Noise Ratio (OSNR) sensitivity, and full compensation for the linear channel distortions (e.g., Chromatic Dispersion—CD and Polarization Mode Dispersion—PMD), low power consumption and low cost is very critical in the metro segment. Without achieving low cost and low power consumption, the move to high quantities of 100 G coherent links will be delayed and the whole market will be pushed away in time.

The power consumption levels should meet the relevant modules form factors, which mostly should be pluggable. A 100 G C Form-Factor Pluggable (CFP—a multi-source agreement to produce a common form-factor for the transmission of high-speed digital signals) is the leading desired one, targeting sub 24 W of total power consumption, allowing sub-15 W of power consumption for a coherent-metro ASIC. Consequently, the ability to support the "coherent metro ASIC" requires very extensive VLSI implementation capabilities and optimizations of the Digital Signal Processing (DSP) coherent algorithms.

It is therefore an object of the present invention to provide a method and system for providing MIMO equalization for baud rate clock recovery in coherent DP-QPSK metro systems, using coherent DSP for 1 sample/symbol.

It is another object of the present invention to provide a method and system for providing MIMO equalization for baud rate clock recovery in coherent DP-QPSK metro systems with reduced processing complexity, which allows using optoelectronic components with reduced BW, lower sampling rate and less power consumption.

Other objects and advantages of the invention will become apparent as the description proceeds.

SUMMARY OF THE INVENTION

The present invention is directed to a MIMO equalization method, optimized for baud rate clock recovery in coherent symbol-spaced DP-QPSK Metro systems. According to this method, the Mueller & Muller timing function is extended to cope with controlled ISI induced signals, while decoupling between MIMO equalization and clock recovery loops, using a midpoint output of the equalizer for timing estimation, instead of its final output. At least a portion of controlled Inter-Symbol Interference (ISI) is kept intact and the controlled ISI is compensated by an MLSE, right after carrier timing synchronization.

The baud rate clock recovery process is adapted to cope with a combined effect of polarization mixing, heavily induced ISI, thereby alleviating baud rate clock recovery.

The error signal used in conventional LMS algorithm of adaptive equalizers may be modified. In one aspect, low-cost reduced bandwidth components are used both in the transmitting and receiving sides, thereby reducing the optical transceiver cost. The low-cost reduced bandwidth components may be used both in the transmitting and receiving sides, thereby supporting aggressive in-line optical filtering introduced by cascaded Reconfigurable Optical Add-Drop Multiplexers (ROADMs—optical add-drop multiplexers that add the ability to remotely switch traffic from a Wavelength-Division Multiplexing system at the wavelength layer) in a Wavelength Division Multiplexing (WDM) network.

In one aspect, the polarization mixing dependency is removed by the $g_{xy}$ and $g_{yx}$ filters while maintaining the temporal timing dependency. Then a delay of determined number of samples is introduced on the 'XX' and 'YY' paths, to compensate for an operation of the $g_{xy}$ and $g_{yx}$ filters on the 'XY' and 'YX' paths. At the next step, time dependent ISI is compensated by the $g_{xx}$ and $g_{yy}$ filters, where prior to equalization, timing estimation is performed, based on the signals $r^{(x)}[n]$ and $r^{(y)}[n]$ at the input to the $g_{xx}$ and $g_{yy}$ filters. Finally, coefficients adaptation of $g_{xx}$, $g_{xy}$, $g_{yx}$ and $g_{yy}$ is performed, such that the operation of the MIMO filter is not affected.

The adaptation of the in-polarization weights $g_{xx}$ and $g_{yy}$ may similar to the original conventional LMS adaptation rule.

The baud rate clock recovery may performed by a timing error detector, a loop filter and a Numerically Controlled Oscillator (NCO—a digital signal generator which creates a synchronous discrete-time, discrete-valued representation of a waveform), while sampling the received signal according to the Nyquist criterion with an ADC which is controlled by a free running clock, or alternatively, by using a timing function consisting of the original M&M timing function and an additional correction term weighted by the coefficients of a decision filter.

The timing drift between the transmitter (Tx) and receiver (Rx) clocks may be digitally corrected using interpolation. The baud rate clock recovery may also be performed such that the timing information exploits the knowledge about the controlled ISI introduced by the adaptive MIMO equalizer.

MIMO equalizer weights adaptation may performed using an m-LMS, while sampling the signal at a constant phase.

The present invention is also directed to a MIMO equalization system optimized for baud rate clock recovery in coherent symbol-spaced DP-QPSK Metro systems, which comprises:

a) a first filter connected to the X polarization path, for receiving the sampled signal from the X polarization path and filtering out a first portion of the X polarization sampled signal;
b) a second filter connected to the Y polarization path, for receiving the sampled signal from the Y polarization path and filtering out a second portion of the Y polarization sampled signal;
c) a delay element in the X polarization path, for delaying the sampled signal in the X polarization path to have timing alignment with the second portion;
d) a delay element in the Y polarization path, for delaying the sampled signal in the Y polarization path to have timing alignment with the first portion;
e) a first adder in the X polarization path for adding the second portion to the delayed signal in the X polarization path;
f) a second adder in the Y polarization path for adding the first portion to the delayed signal in the Y polarization path;
g) a first Timing Error Detection (TED) unit, connected to the output of the first adder, for signal timing estimation and timing synchronization of the signal in the X polarization path;
h) a second Timing Error Detection (TED) unit, connected to the output of the second adder, for signal timing estimation and timing synchronization of the signal in the Y polarization path;
i) a third filter connected to the output of the first adder, for reconstructing the signal received in the X polarization path;
j) a fourth filter connected to the output of the second adder, for reconstructing the signal received in the Y polarization path; and
k) an error correction and adaptation unit, for adapting the taps of the filters to minimize the clock timing error in each path.

The delay of each delay element may be half the length of each filter.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention proposes a novel MIMO equalization architecture optimized for Baud rate Clock Recovery MIMO (BCR-MIMO) in coherent symbol-spaced (e.g., 112 Gbit/sec) Dual Polarization Quadrature Phase Shift Keying (DP-QPSK) metro systems. This architecture is designed to decouple between Multiple-Input-Multiple-Output (MIMO) equalization and Clock Recovery (CR) loops, thereby avoiding the interaction between them. The decoupling between the two loops is achieved, while maintaining similar MIMO equalizer performance, as compared to the butterfly-structured equalizer.

The present invention suggests design and optimization of the DSP algorithms for coherent-metro, based on the existing 1 sample per symbol (sps) approach with Anti-Aliasing Filtering (AAF) and Maximum Likelihood Sequence Estimation (MLSE), which is suitable for low power coherent metro applications. Baud rate equalization related algorithms for metro Dual-Polarization Quadrature Phase Shift Keying (DP-QPSK) systems have been recently presented and analyzed. It has been proposed to use a modified reference signal, causing the MIMO equalizer to converge to a different solution, thereby significantly reducing the inherent noise enhancement present in linear equalizer. Some portion of controlled Inter-Symbol Interference (ISI), is kept intact, resulting in '16 QAM-like' (quadrature amplitude modulation) instead of QPSK signal at the equalizer output in each polarization. This controlled ISI is compensated at the later stage by the MLSE, right after carrier synchronization. Baud rate Timing Error Detection (TED), suitable for this '16 QAM-like' signal (with controlled ISI) is derived and analyzed. In order to avoid coupling between the CR and MIMO loops, the present invention proposes a novel BCR-MIMO architecture. The decoupling concept and weight adaptation rules are presented and explained below.

Coherent DSP for 1 Sample/Symbol Approach

Optical fiber channel impairments are compensated by means of coherent detection with subsequent DSP. The key idea is that coherent detection retrieves both the phase and the amplitude of the received optical field, thereby allowing digital equalization of linear channel impairments such as CD and PMD. In addition to the impairments compensations, carrier synchronization and baud rate clock recovery tasks are required. Many existing solutions describe the principles and most common algorithms for coherent DSP, based on two samples per symbol.

Figure 1:
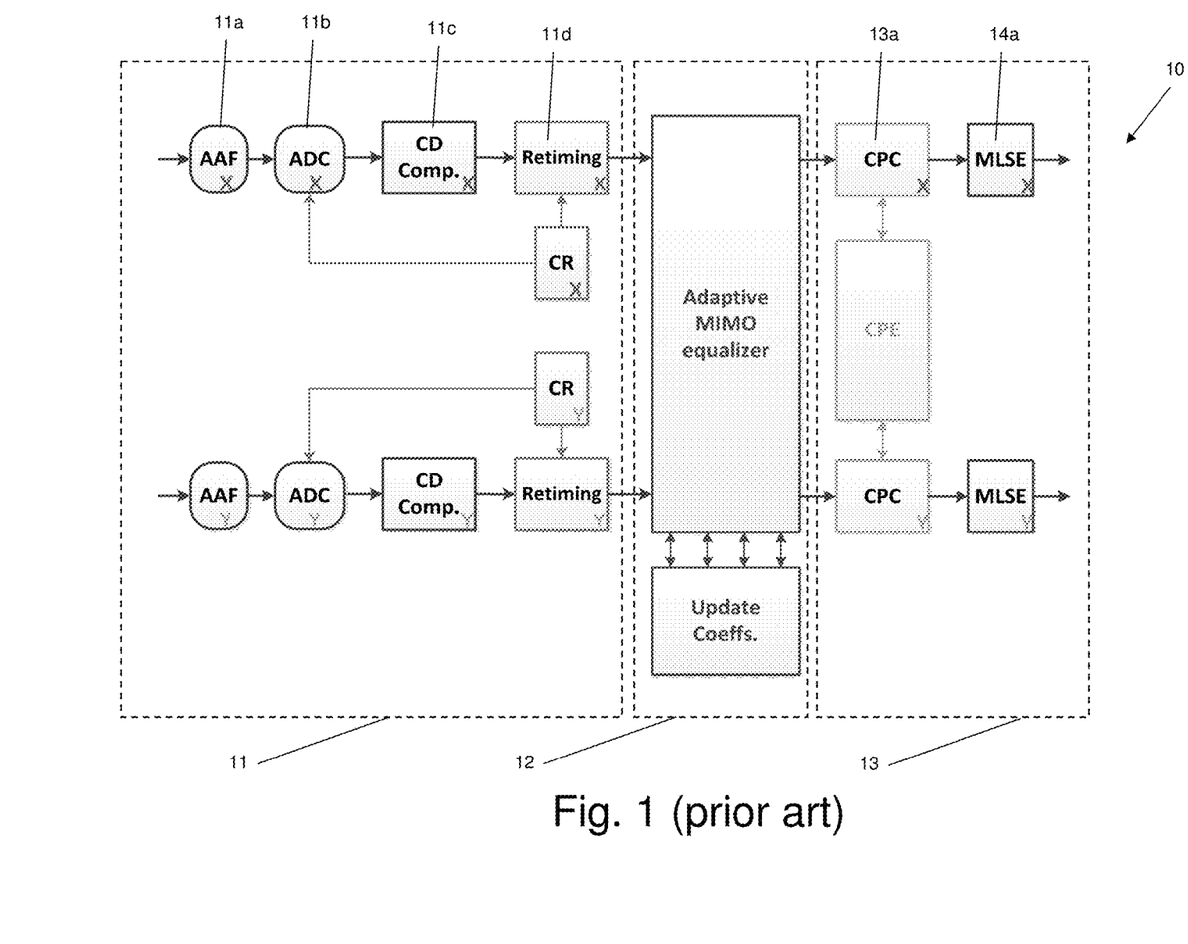
FIG. 1 (prior art) illustrates a block diagram of the Post Processing Unit (PPU), following immediately after O/E conversion, suitable for (DP-QPSK) modulation format.

FIG. 1 (prior art) illustrates a block diagram of the Post Processing Unit (PPU), following immediately after O/E conversion, suitable for (DP-QPSK) modulation format. There are four lanes at the PPU input carrying the information of in-phase and quadrature components of the received optical field at both polarizations. In the 1 sample per symbol algorithmic data flow of FIG. 1, there is a strong AAF at the PPU input to fulfill the Nyquist criterion. An MLSE is used as a decision device, to compensate for the ISI introduced by the AAFs, the MIMO structure facilitates a timing recovery loop, with modified equalization algorithm and baud rate is used instead of oversampled CR.

The post processing unit (PPU) 10 includes three main loops: a CR loop 11, a MIMO filter weights adaptation loop 12 and a Carrier Phase Estimation (CPE) and Carrier Phase Correction (CPC) loop 13. The interconnections between the various control loops are omitted for clarity. Each path in the CR loop 11 (which includes an input signal with X or Y polarization) consists of an AAF unit 11a for filtering the received signal, followed by an Analog-To-Digital Converter (ADC) 11b. Both ADCs are operating at the baud rate, i.e., taking 1 sample/symbol, resulting in 50% lower power dissipation as compared to their 2 samples/symbol counterparts. The channel's linear distortion (Chromatic Dispersion) is compensated by a CD compensator and a retiming unit 11d compensates for synchronization inaccuracy between the clocks in the receiver and transmitter, so as to assure sampling at the baud rate. The MIMO filter weights adaptation loop 12 is responsible for polarization demultiplexing.

As already known from existing systems, sampling the received signal at the symbol rate forms sufficient information to recover the transmitted digital data. Without an appropriate AAF, the Shannon-Kotelnikov sampling theorem is violated and aliasing is introduced. However, even though the AAF reduces the noise (as being a kind of a low-pass filter), it increases the level of ISI, which will be compensated later on by the MLSE. Using conventional baud-rate equalizers, following heavy AAF, results in significant performance degradation. It is possible to modify the equalizer cost function in order to achieve noise vs. ISI tradeoff optimization. To overcome the residual ISI problem, the conventional Hard Decision (HD) slicer in each path is replaced by an MLSE 13a, which is fed by Carrier Phase Correction (CPC) unit 14a. A Carrier Phase Estimation (CPE) unit is used for phase estimation for both X and Y paths.

Baud Rate Clock Recovery Oriented Adaptive MIMO Equalizer (BCR-MIMO)

The present invention proposes a novel architecture for adaptive MIMO filtering, which decouples between the equalizer and clock recovery loops, to avoid interaction between them and to increase their stability.

Figure 2A:
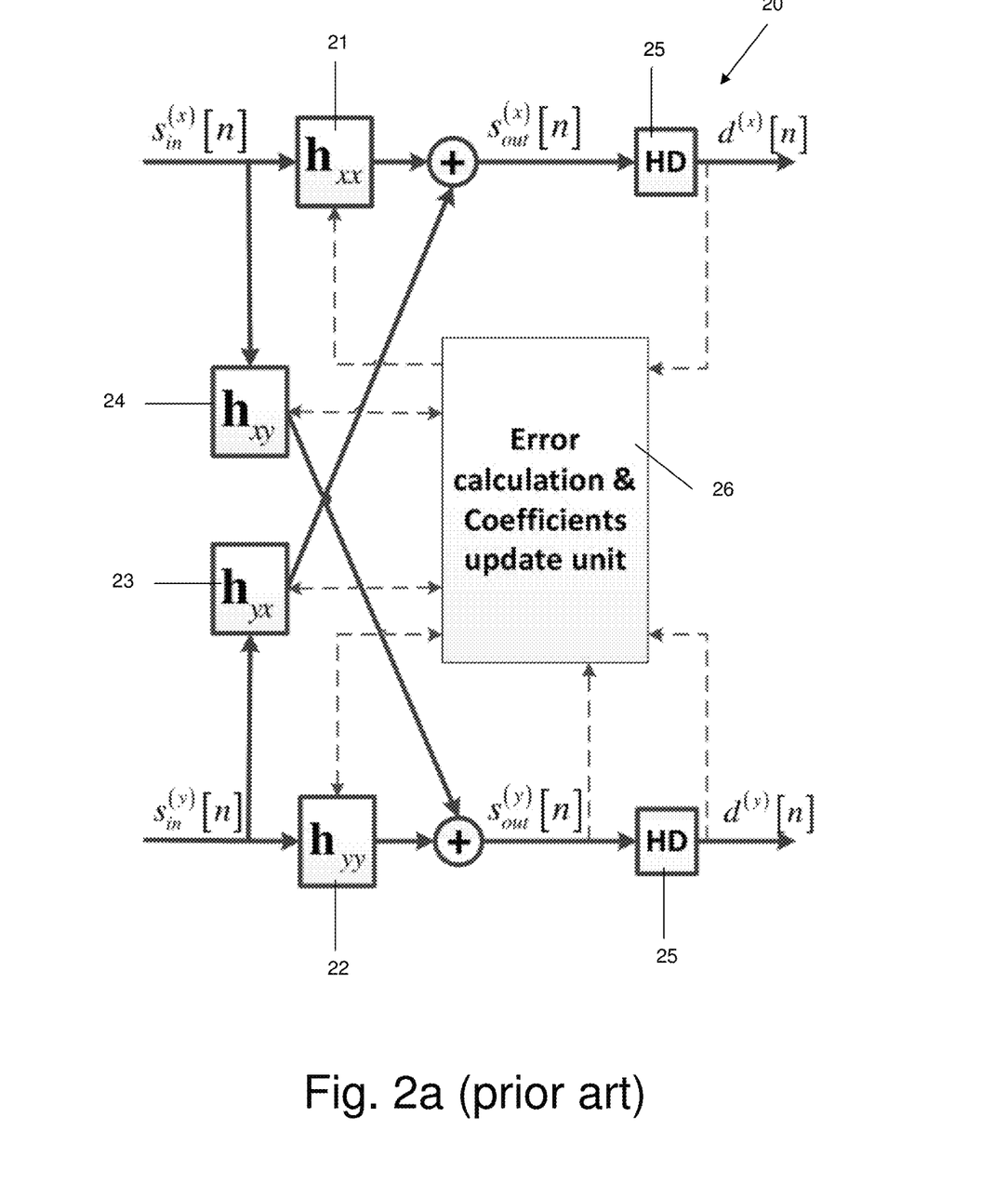
FIG. 2a (prior art) shows a conventional adaptive MIMO equalizer architecture 20, in a conventional butterfly configuration.

FIG. 2a (prior art) shows a conventional adaptive MIMO equalizer architecture 20, in a conventional butterfly configuration. The X polarization path includes an $h_{xx}$ filter 21 which determines which portion of the received signal in path X will remain in X polarization. The Y polarization path includes an $h_{yy}$ filter 22 which determines which portion of the received signal in path Y will remain in Y polarization. An $h_{yx}$ filter 23 determines which portion of the received signal in path Y will be added to the signal with X polarization at the output of $h_{xx}$ filter 21. Similarly, An $h_{xy}$ filter 24 determines which portion of the received signal in path X will be added to the signal with Y polarization at the output of $h_{yy}$ filter 22. The resulting signals (after additions) $S_{out}(x)[n]$ and $S_{out}(y)[n]$ are forwarded to an HD 25 in each path to reconstruct the transmitted symbol in each path. The taps of each filter are updated by an error calculation and coefficients update unit 26.

As will be shown below, the most common baud rate Mueller & Muller timing estimator (which is a timing recovery estimator that recovers the symbol timing phase of the input signal by implementing a decision-directed, data-aided feedback method that requires prior recovery of the carrier phase), requires both a reference signal (as depicted from Eq. 3) and a pre-equalized sampled signal, for correct operation. Since the baud rate equalizer is capable of correcting timing errors (up to some extent), trying to use a MIMO equalizer output for residual timing estimation will inevitably lead to unpredictable interaction between the timing recovery and equalization loops. Since the equalizer inputs contain a convolutive mixture of the original channel inputs, simple timing functions like M&M cannot be used due to presence of the information at the equalizer input.

Figure 2B:
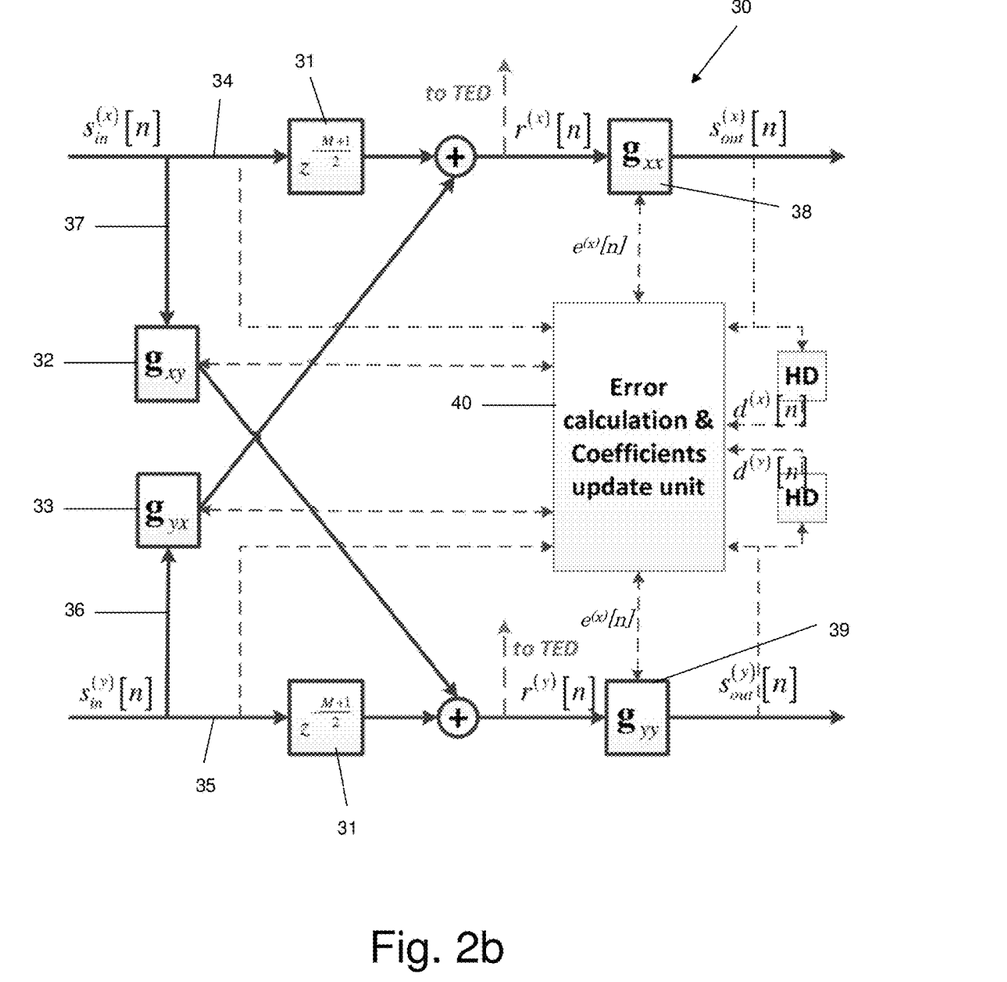
FIG. 2b illustrates a novel architecture (BCR-MIMO) to decouple the timing and MIMO equalizer loops.

FIG. 2b illustrates a novel architecture (BCR-MIMO) to decouple the timing and MIMO equalizer loops, according to the present invention. Instead of using the equalizer's output for timing estimation, its input is used to thereby removing the dependency between these loops. The proposed BCR-MIMO filtering is done in two stages. In this construction, there are no $h_{xx}$ or $h_{yy}$ filters (like in the conventional butterfly configuration adaptive MIMO equalizer architecture of FIG. 2a), since these filters mask some of the timing information. Instead, only the $g_{xy}$ and $g_{yx}$ filters on the 'XY' and 'YX' paths 36 and 37 are used for separating between polarizations X and Y, such that the resulting signals $r^{(x)}[n]$ and $r^{(y)}[n]$ are not sufficient for reconstructing the received signals but contain sufficient information for timing recovery and therefore, are fed to the Timing Error Detection (TED) circuitry. In this way, the weights adaptation and timing loops are decoupled, since the loops do not share the same output for the adaptation. The "missing" filtering of no $h_{xx}$ or $h_{yy}$ filters (required for reconstructing the received signals is compensated by $g_{xx}$ and $g_{yy}$ filters 38 and 39.

At the first stage, the polarization mixing dependency is almost removed by the $g_{xy}$ and $g_{yx}$ filters 32 and 33, leaving temporal dependence almost intact:

$$r^{(p_1)}[n] = g_{p_2p_1}^T[n]s_{in}^{(p_2)}[n] + s_{in}^{(p_1)}\left[n - \frac{M+1}{2}\right], \qquad [\text{Eq. 1}]$$

$$p_1, p_2 \in \{x,y\}, \; p_1 \neq p_2$$

where '$T$' designates a vector transpose operation, '·' stands for vector scalar product operation, $s_{in}^{(p_1)}[n]$ is the input sample in polarization $p_1$, $s_{in}^{(p_2)}[n] \equiv [n], s_{in}^{(p_2)}[n-1], \ldots, s_{in}^{(p_2)}[n-M+1]]^T$ is the input signal vector in polarization $p_2$ and $g_{p_2p_1}$, $[n] \equiv [g_0^{(p_2p_1)}[n], \ldots, g_{M-1}^{(p_2p_1)}[n]]^T$ is filter coefficients, accounting for the signal transfer from polarization $p_2$ to polarization $p_1$.

A delay of $$\frac{M+1}{2}$$

samples on the 'XX' and 'YY' paths 34 and 35 is required, to compensate for an operation of the $g_{xy}$ and $g_{yx}$ filters on the 'XY' and 'YX' paths 36 and 37, respectively (since it takes time until the data regarding the X path will be output by $g_{xy}$ filter 32 and until the data regarding the Y path will be output by $g_{yx}$ filter 33. Therefore, each received signal is delayed to get alignment between the signal in a path and the portion of the signal from the other path which should be added to it). The delay operation 31 is designated by $$z^{-\frac{M+1}{2}},$$

which is about half the length of the filter (assuming a linear phase). As a result, the calculations performed by the error calculation and coefficients update unit 40 will be different from those of the error calculation and coefficients update unit 26 (of FIG. 2a), as will be detailed below.

At the second stage, time dependent ISI is compensated by means of $g_{xx}$ and $g_{yy}$ filters 38 and 39:

$$s_{out}^{(p)}[n] = g_{pp}^T \cdot [n] r^{(p)}[n] \in p\{x,y\} \qquad [\text{Eq. 2}]$$

where $r^{(p)}[n] \equiv [r^{(p)}[n], r^{(p)}[n-1], \ldots, r^{(p)}[n-M+1]]^T$ is the input vector signal to the $g_{pp}$ filter. The signals $r^{(x)}[n]$ and $r^{(y)}[n]$ at the input to the $g_{xx}$ and $g_{yy}$ filters, are now suitable for timing estimation. This modification allows taking the signal for timing estimation prior to equalization, thereby effectively decoupling the two aforementioned loops.

The coefficients adaptation rule of $g_{xx}$, $g_{xy}$, $g_{yx}$ and $g_{yy}$ is derived, such that the operation of the MIMO filter shown in FIG. 2b, is identical to is conventional counterpart shown in FIG. 2a. Thus, the error signal $e^{(p)}$ for weights adaptation is the same as in the conventional butterfly architecture:

$$e^{(p)}[n] = d^{(p)}[n] - s_{out}^{(p)}[n], p \in \{x,y\} \qquad [\text{Eq. 3}]$$

where $d^{(p)}[n]$ is the reference signal.

It is already known how to design the polarization de-multiplexer adaptive MIMO filter in order to reduce noise enhancement and obtain optimal performance. The error signal equation for the weights adaptation in the MIMO equalizer should be adjusted, according to m-LMS criterion, resulting in a '16-QAM like' constellation, instead of a QPSK constellation. Hence, introducing the m-LMS modification, together with a CPE correction term yields:

$$d^{(p)}[n] = h*_{AAF}(\hat{y}^{(p)}[n]e^{j\cdot\phi_{CPE}[n-1]}), \epsilon p\{x,y\} \qquad [\text{Eq. 4}]$$

where '*' denotes a convolution operation, $$h_{AAF}[n] = \begin{bmatrix} \frac{2}{3} & \frac{1}{3} \end{bmatrix}$$

is two-tap approximation of the AAF impulse response, $\hat{y}^{(p)}[n]$ is either the HD slicer output or training symbol, and $\phi_{CPE}[n-1]$ is the estimated carrier phase from previous step.

The adaptation of the in-polarization weights $g_{xx}$ and $g_{yy}$ is similar to the original conventional LMS adaptation rule:

$$g_{pp}[n+1] = g_{pp}[n] \mu r_{in}^{(p)}*[n](e^{(p)}\cdot[n])^*, p \in \{x, \mathscr{P}\} \qquad [\text{Eq. 5}]$$

where $\mu$ is the step size and '*' denotes the complex conjugate operation. The cross-polarization weights adaptation rule for the proposed architecture is given by:

$$g_{p_1 p_2}[n+1] = g_{p_1 p_2}[n] \mu q^{(p_1 p_2)}*[n](e^{(p_1)}[n])^*, p_1, p_2 \in \{x,y\}, p_1 \neq p_2 \qquad [\text{Eq. 6}]$$

where $q^{(p_1 p_2)}[n] \equiv [q^{(p_1 p_2)}[n-1], \ldots, q^{(p_1 p_2)}[n-M+1]]$ is a control vector signal, obtained by:

$$q^{(p_1 p_2)}[n] \equiv g_{p_2 p_2}^T[n] \cdot s_{in}^{(p_1)}[n], p_1, p_2 \in \{x,y\}, p_1 \neq p_2 \qquad [\text{Eq. 7}]$$

Eq. 6 and Eq. 7 are obtained by differentiation of the Mean Square Error (MSE) $E\{(d^{(p_2)}[n] - s_{out}^{(p_2)}[n])^2\}$ with respect to $g_{p_1 p_2}[n]$, $p_1 \neq p_2$, and using a single-sample approximation of the expectation operator $E\{\cdot\}$ to get an LMS adaptation.

An intuitive frequency domain behavior clarifies the final solution to which the proposed MIMO equalizer weights converge. If $\mathscr{W}(f)$ is the frequency domain channel matrix of filters, accounting for both polarization mixing and temporal filtering operations (e.g. AAF, optical filtering, etc.), then:

$$\mathscr{W}(f) \equiv \begin{bmatrix} W_{xx}(f) & W_{xy}(f) \\ W_{yx}(f) & W_{yy}(f) \end{bmatrix} \qquad [\text{Eq. 8}]$$

Assuming perfect CD compensation and perfect carrier synchronization, the conventional MIMO butterfly structure with weights adaptation m-LMS rule $\mathscr{H}(f)$, where the reference signal is given by Eq. 4 will approximately converge to the sampled version of the inverse PMD matrix solution $\mathscr{P}^{-1}(f)$, where $\mathscr{P}(f)$ is defined as $$\mathscr{P}(f) \equiv \begin{bmatrix} P_{xx}(f) & P_{xy}(f) \\ P_{yx}(f) & P_{yy}(f) \end{bmatrix} \Rightarrow$$

$$\mathscr{H}(f) \approx \mathscr{P}^{-1}(f) \equiv \frac{1}{|\mathscr{P}|} \begin{bmatrix} P_{xx}(f) & -P_{xy}(f) \\ -P_{yx}(f) & P_{yy}(f) \end{bmatrix} \qquad [\text{Eq. 9}]$$

The overall channel matrix $\mathscr{W}(f)$ can be approximately decomposed to be:

$$\mathscr{W}(f) \approx \mathscr{P}(f) \mathscr{H}(f) \qquad [\text{Eq. 10}]$$

where $\mathscr{H}(f)$ is a diagonal matrix, responsible for temporal ISI. As described earlier, the two stages of the BCR-MIMO $\mathscr{G}(f)$ and $\mathscr{U}(f)$ can be described mathematically in the frequency domain as:

$$\mathscr{H}(f) = \mathscr{P}^{-1}(f) \underbrace{\mathscr{U}(f)}_{\text{stage \#2}} \underbrace{\mathscr{G}(f)}_{\text{stage \#1}} \qquad [\text{Eq. 11}]$$

where:

$$\mathscr{G}(f) \equiv \begin{bmatrix} G_{xx}(f) & G_{xy}(f) \\ G_{yx}(f) & G_{yy}(f) \end{bmatrix} = \frac{1}{|\mathscr{P}|} \begin{bmatrix} P_{yy}(f) & -\frac{P_{xy}(f)}{P_{yy}(f)} \\ -\frac{P_{yx}(f)}{P_{xx}(f)} & P_{xx}(f) \end{bmatrix} \qquad [\text{Eq. 12}]$$

$$\mathscr{U}(f) \equiv \begin{bmatrix} 0 & P_{xx}(f) \\ P_{yy}(f) & 0 \end{bmatrix}$$

The first stage of the BCR-MIMO matrix $\mathscr{G}(f)$, will converge to somewhat different solution for the equalizer weights, i.e. $\mathscr{G}(f) \neq \mathscr{H}(f)$. However, the two MIMO configurations, shown in FIGS. 2a and 2b, will eventually converge to the same solution, i.e. the filter's outputs $s_{out}^{(p)}[n]$, will be the same, up to the delay introduced in the latter configuration, provided that Eq. 4 is used as a reference signal in both cases.

Extended M&M Timing Function for Baud Rate Clock Recovery

The design of the baud rate clock recovery for coherent single carrier optical fiber communication systems includes three typical building blocks of the clock recovery system: a timing error detector, a loop filter and a numerically controlled oscillator (NCO). In theory, if the received signal is sampled according to Nyquist criterion, as in the current system, an ADC which is controlled by a free running clock can be used, whereas the timing drift between the transmitter (Tx) and receiver (Rx) clocks can be digitally corrected using interpolation. Slow control may be also applied directly to the ADC to track small timing variations (e.g. due to temperature variations).

The clock recovery design in the system proposed by the present invention is the selection of timing function that can detect the timing changes in the ISI limited regime, deliberately introduced by the AAF (and/or strong optical filtering). Due to the heavily ISI induced signal, a conventional M&M TED cannot be used, because of the high rate of decision errors. Here, an extended M&M (e-M&M) TED is proposed, such that the timing information exploits the knowledge about the controlled ISI introduced by the adaptive MIMO equalizer (Eq. 4).

The classical M&M timing function $z_{M\&M}[n]$ is given by:

$$z_{M\&M}[n]=\text{Re}\{(\hat{y}^*[n]y[n1]\cdot y[n{-}\hat{y}^*{+}n1]\cdot)\} \quad [\text{Eq. 13}]$$

where y[n] and y[n−1] are current and previous HD slicer incoming samples, with corresponding decisions or training symbols ŷ[n] and ŷ[n−1]. To include the effect of the controlled ISI introduced by the adaptive MIMO filter, together with the CPE correction term the reference signal given by Eq. 4 can be used by:

$$z_{e\text{-}M\&M}^{(p)}[n]=\text{Re}\{(d^{(p)}[n])^*r^{(p)}[n1]\cdot r^{(p)}[n]- (d^{(2)}[n1])^*\},p\{-ox,y\} \quad [\text{Eq. 14}]$$

Approximating the AAF impulse response by a two-tap filter $$h_{AFF} = \begin{bmatrix} \frac{2}{3} & \frac{1}{3} \end{bmatrix},$$

to obtain a '16-QAM-like' constellation, or alternatively replacing the QPSK slicer by its 16-QAM counterpart, yields the following timing function:

$$z_{e\text{-}M\&M}^{(p)}[n] = \quad [\text{Eq. 15}]$$

$$\frac{2}{3}\text{Re}\{(d^{(p)}[n])^* \cdot r^{(p)}[n-1] - r^{(p)}[n] \cdot (d^{(p)}[n-1])^*\} +$$

$$\frac{1}{3}\text{Re}\{(d^{(p)}[n-1])^* \cdot r^{(p)}[n-1] - r^{(p)}[n] \cdot (d^{(p)}[n-2])^*\}$$

As Eq. 15 suggests, the newly extended timing function $z_{e\text{-}M\&M}^{(p)}[n]$ consists of the original M&M timing function $z_{M\&M}[n]$ and an additional correction term weighted by the decision filter coefficients $h_{AAF}$. The purpose of the correction term is to take into account the controlled ISI introduced by the modified adaptive MIMO equalizer.

Figure 3:
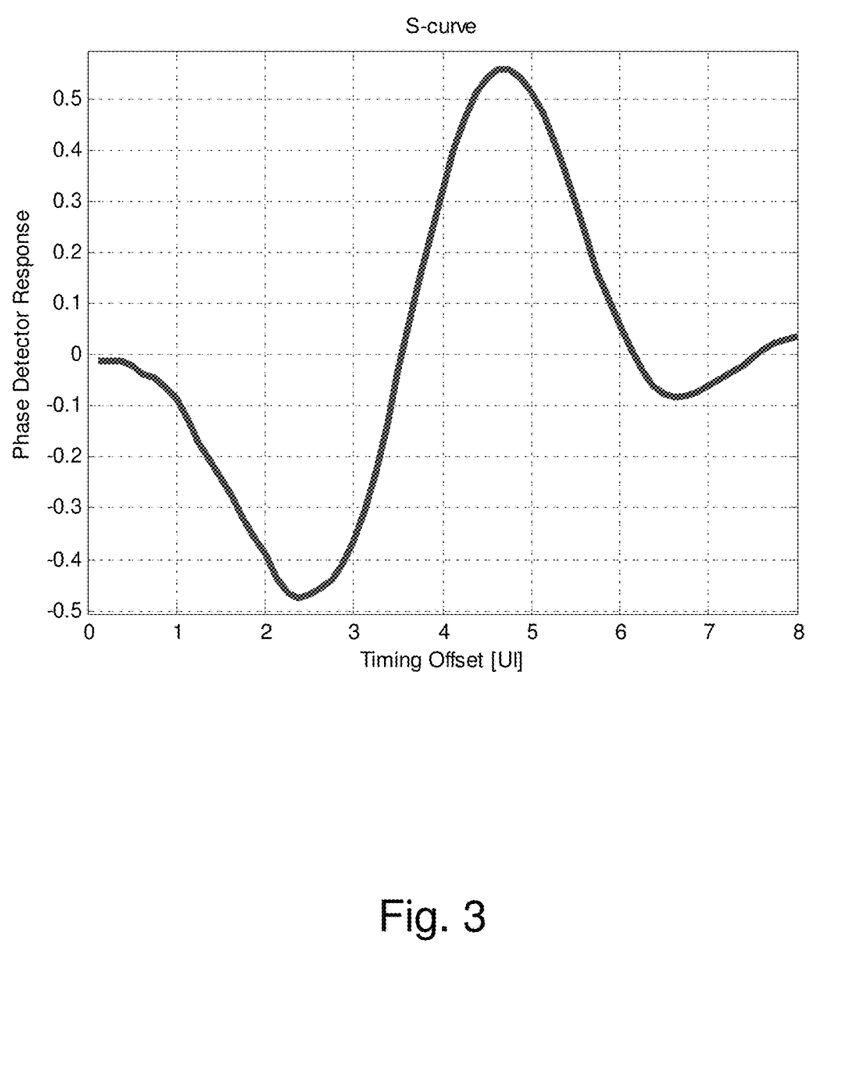
FIG. 3 shows an S-curve for a typical impulse response, where UI is the unit interval.

Assuming perfect carrier synchronization and perfect CD compensation, the residual equivalent continuous time channel (Tx+channel+Rx) impulse response is given by a diagonal matrix having the elements denoted as $h_r(t)=F^{-1}\{\mathcal{H}(f)\}$ (from Eq. 10) on its main diagonal. Hence, the S-curve (a sigmoid function bounded differentiable real function that is defined for all real input values and has a positive derivative at each point) of the proposed timing function, $S_p(\tau) \equiv E\{z_{e\text{-}M\&M}^{(p)}[n,\tau]\}$ is given by:

$$S_p(\tau) = \sigma_a^2\left[\frac{2}{3}(h_r(T+\tau)\,h_r(\tau-T)) - \frac{1}{3}(h_r(2T+\tau)+h_r(\tau))\right] \quad [\text{Eq. 16}]$$

where T is the symbol duration and $\sigma_a^2$ is the variance of the original (QPSK) vocabulary in each polarization. FIG. 3 shows an S-curve for a typical impulse response $h_r(t)$, where UI is the unit interval (i.e., the symbol duration time).

It can be clearly seen from FIG. 3 that the proposed timing function, is monotonic in the relevant region (between UI=2.5 to UI=4.5), and has a root near the optimal sampling instant (3.5 UI in this example, which is the delay of the chosen $h_r(t)$), and thus contains sufficient timing information. Moreover, since there is a weak BER sensitivity to the sampling phase, the m-LMS algorithm can be used for adaptive MIMO equalizer weights adaptation. Therefore, the task of clock recovery is reduced to the clock frequency synchronization, provided that the signal is sampled at a constant phase.

Figure 4:
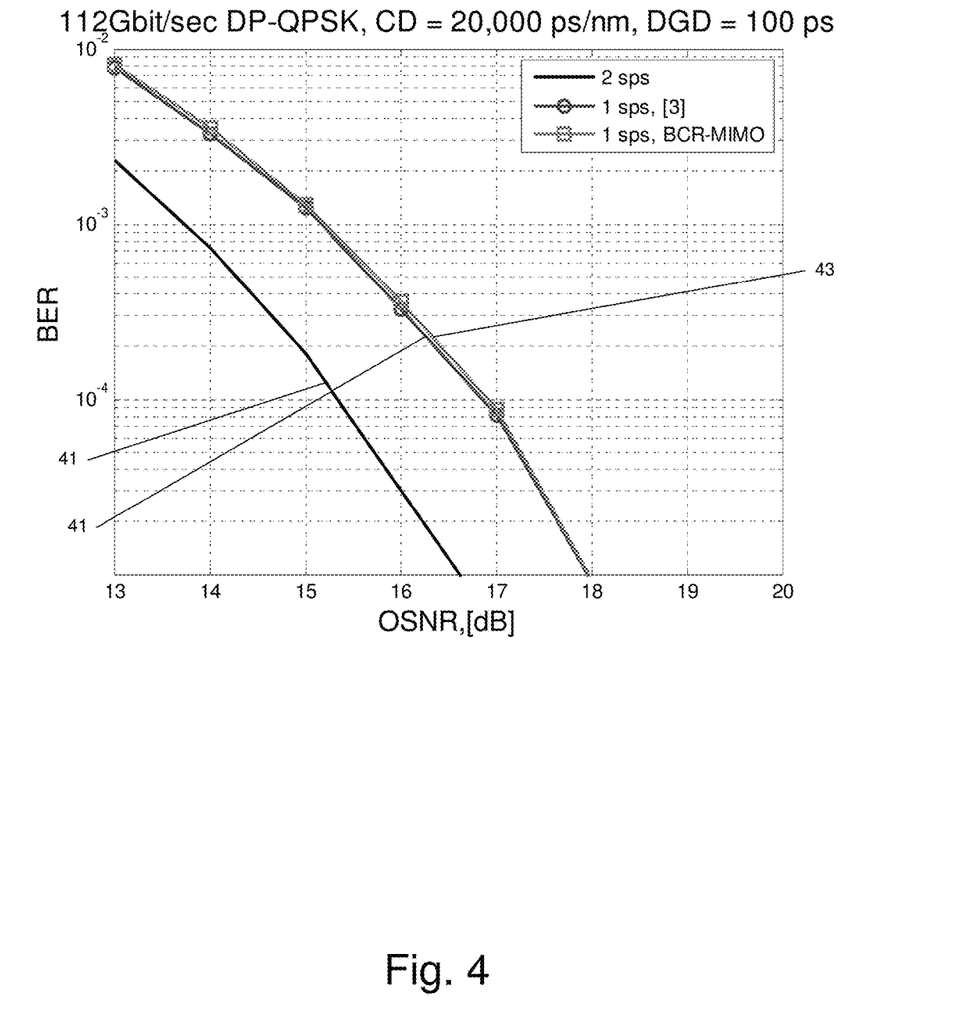
FIG. 4 shows simulated performance of the proposed system, using a conventional coherent E/O front-end.

FIG. 4 shows simulated performance of the proposed system, using a conventional coherent Electrical-to-Optical (E/O) front-end, where the drivers frequency response are modeled as a 25 GHz, 5th order Butterworth filter and the Mach-Zehnder Modulator (MZM) frequency response is assumed to have a 2nd order Bessel shape with 20 GHz cutoff frequency. The Optical Filter (OF) is taken to follow a 6th order Super-Gaussian filter shape with 50 GHz bandwidth. The Optical-to-Electrical (O/E) front-end frequency response is modeled as a 20 GHz 5th order Bessel filter. A 5th order Butterworth filter with 12 GHz cutoff frequency is used as the AAF. The optical channel impairments include $$CD = 20{,}000\,\frac{\text{ps}}{\text{nm}}$$

and Differential Group Delay (DGD) of DGD=100 ps.

13 tap filters were used for adaptive MIMO filtering $g_{p_1 p_2}$, $p_1, p_2, \in \{x,y\}$, whereas the step-size μ=0.001 was used. 40,000 training symbols were used for MIMO, MLSE blocks learning. The MLSE (per polarization) with memory depth of one symbol was used, while assuming ideal carrier and clock synchronization.

FIG. 4 shows three bit error rate (BER) curves vs Optical Signal to Noise Ratio (OSNR). Curve 41 shows the performance of a conventional 112 Gbit/sec DP-QPSK system with 2 samples per symbol (2 sps), whose MIMO block diagram is shown in FIG. 2a. Curve 42 presents the performance of a conventional adaptive MIMO architecture and curve 43 presents the performance of the BCR-MIMO scheme, proposed by the present invention. It can be seen that the OSNR penalty at the pre-FEC (Forward Error Correction) BER of $10^{-3}$ is 1.5 dB as compared to the 2sps system. The simulation results confirm that there is no performance degradation of the proposed BCR-MIMO architecture as compared to a conventional MIMO with butterfly architecture, since the equalizer weights are adjusted according to the same m-LMS criterion in both cases. The BCR-MIMO architecture proposed by the present invention enables significant cost reduction, and allows using optoelectronic components with reduced BW, lower sampling rate and less power consumption of the ADCs. The resulting reduced processing complexity makes the proposed BCR-MIMO architecture suitable for metro and datacenter interconnection applications.

The above examples and description have of course been provided only for the purpose of illustration, and are not intended to limit the invention in any way. As will be appreciated by the skilled person, the invention can be carried out in a great variety of ways, employing more than one technique from those described above, other than used in the description, all without exceeding the scope of the invention.

The invention claimed is:

1. A BCR-MIMO equalization system optimized for baud rate clock recovery in coherent symbol-spaced DP-QPSK Metro systems, comprising:
   a) a first filter connected to the X polarization path, for receiving the sampled signal from the X polarization path and filtering out a first portion of the X polarization sampled signal;

b) a second filter connected to the Y polarization path, for receiving the sampled signal from the Y polarization path and filtering out a second portion of the Y polarization sampled signal;

c) a delay element in said X polarization path, for delaying the sampled signal in the X polarization path to have timing alignment with said second portion;

d) a delay element in said Y polarization path, for delaying the sampled signal in the Y polarization path to have timing alignment with said first portion;

e) a first adder in said X polarization path for adding said second portion to the delayed signal in the X polarization path;

f) a second adder in said Y polarization path for adding said first portion to the delayed signal in the Y polarization path;

g) a first Timing Error Detection (TED) unit, connected to the output of said first adder, for signal timing estimation and timing synchronization of the signal in the X polarization path;

h) a second Timing Error Detection (TED) unit, connected to the output of said second adder, for signal timing estimation and timing synchronization of the signal in the Y polarization path;

i) a third filter connected to the output of said first adder, for reconstructing the signal received in said X polarization path;

j) a fourth filter connected to the output of said second adder, for reconstructing the signal received in said Y polarization path; and k) an error correction and adaptation unit, for adapting the taps of said filters to minimize the clock timing error in each path.

2. A system according to claim 1, in which the delay of each delay element is half the length of each filter.

3. A system according to claim 1, in which polarization mixing dependency is removed by the first ($g_{xy}$) and the second ($g_{yx}$) filters, while maintaining temporal timing dependency.

4. A system according to claim 1, in which compensating time dependent ISI by the third and the fourth filters.

5. A system according to claim 1, in which timing estimation performed prior to equalization, based on the signals at the input to the third ($g_{xx}$) and the fourth ($g_{yy}$) filters.

6. A system according to claim 1, in which the taps of the filters are adapted using m-LMS, while sampling the signal at a constant phase.

* * * * *